(12) United States Patent
Junggebauer

(10) Patent No.: US 9,482,257 B2
(45) Date of Patent: Nov. 1, 2016

(54) CONFIGURATION COMPRISING A COMPONENT AND A FIXING SYSTEM FOR ELASTIC ATTACHMENT OF THE COMPONENT TO A PANEL-SHAPED SUPPORT PART

(71) Applicant: Volkswagen Aktiengesellschaft, Wolfsburg (DE)

(72) Inventor: Jens Junggebauer, Braunschweig (DE)

(73) Assignee: Volkswagon Aktiengesellschaft, Wolfsburg (DE)

( * ) Notice: Subject to any disclaimer, the term of this patent is extended or adjusted under 35 U.S.C. 154(b) by 242 days.

(21) Appl. No.: 14/341,090

(22) Filed: Jul. 25, 2014

(65) Prior Publication Data

US 2014/0334870 A1   Nov. 13, 2014

Related U.S. Application Data

(63) Continuation of application No. PCT/EP2013/050556, filed on Jan. 14, 2013.

(30) Foreign Application Priority Data

Jan. 25, 2012  (DE) .................. 10 2012 001 457

(51) Int. Cl.
*B25G 3/18* (2006.01)
*F16B 21/00* (2006.01)
(Continued)

(52) U.S. Cl.
CPC .............. *F16B 21/04* (2013.01); *B60S 1/0447* (2013.01); *B60S 1/0438* (2013.01); *Y10T 403/591* (2015.01)

(58) Field of Classification Search
CPC ................. Y10T 403/591; Y10T 403/7005; Y10T 403/7007; Y10T 403/7009; Y10T 24/309; Y10T 24/45105; Y10T 24/4578; Y10T 24/44026; B60S 1/0438; B60S 1/0447; F16B 21/02; F16B 21/04; F16B 5/0241; F16B 5/10
USPC ........ 403/332.1, 348–351; 296/96.15, 96.17; 411/349, 549, 553
See application file for complete search history.

(56) References Cited

U.S. PATENT DOCUMENTS 30,801 A      12/1860  Cleveland
4,442,571 A *  4/1984  Davis ................... F16B 5/10
                                              24/586.1

(Continued)

FOREIGN PATENT DOCUMENTS

CN   1585706 A   2/2005
CN   1894511 A   1/2007
(Continued)

*Primary Examiner* — Gregory Binda
*Assistant Examiner* — Nahid Amiri
(74) *Attorney, Agent, or Firm* — Muncy, Geissler, Olds & Lowe, P.C.

(57) ABSTRACT

A configuration has a component equipped with a retaining foot and a fixing system with a fixing element for elastic attachment of the component to a panel-shaped support part. The fixing element has a central connecting region in the form of a shaft, to which a support plate is attached at one end and to which a cam element is attached at the other end, and an elastomer sleeve surrounds the connecting region, the sleeve having a groove into which the retaining foot engages. The cam element is inserted through a borehole in the support part such that the elastomer sleeve is pressed together between the support plate and the support part, and the fixing element is rotated for a latching connection. A retaining foot plug part with an annular shape partly open in a C shape and adapted to the inner diameter of the retaining groove.

14 Claims, 6 Drawing Sheets

(51) Int. Cl.
   *F16D 1/00*   (2006.01)
   *F16B 21/04*  (2006.01)
   *B60S 1/04*   (2006.01)

(56) References Cited

U.S. PATENT DOCUMENTS

| | | | |
|---|---|---|---|
| 4,647,262 A * | 3/1987 | Yokota | F16B 21/02 24/453 |
| 5,123,795 A | 6/1992 | Engel et al. | |
| 5,368,427 A * | 11/1994 | Pfaffinger | F16B 21/04 24/580.1 |
| 5,511,919 A | 4/1996 | Scalise | |
| 6,237,970 B1 | 5/2001 | Joannou | |
| 6,902,221 B2 * | 6/2005 | Egner-Walter | B60S 1/0447 15/250.001 |
| 6,923,591 B2 * | 8/2005 | Egner-Walter | B60S 1/0447 15/250.31 |
| 6,955,515 B2 * | 10/2005 | Barina | F16B 21/02 411/508 |
| 6,988,863 B2 * | 1/2006 | Hulin | F16B 21/09 411/3 |
| 7,240,778 B2 * | 7/2007 | Duncanson | A45C 13/08 150/105 |
| 7,281,303 B2 * | 10/2007 | Terrill | B60S 1/0447 24/289 |
| 7,503,615 B2 * | 3/2009 | Albrecht | B60S 1/0438 296/96.15 |
| 7,743,457 B2 * | 6/2010 | Metz | B60S 1/0447 15/250.3 |
| 7,955,038 B2 | 6/2011 | Silbereisen et al. | |
| 8,123,308 B2 | 2/2012 | Schlitzkus et al. | |
| 2007/0294851 A1 * | 12/2007 | Egner-Walter | B60S 1/0447 15/250.21 |
| 2009/0208311 A1 | 8/2009 | Churchill | |

FOREIGN PATENT DOCUMENTS

| | | |
|---|---|---|
| CN | 101278140 A | 10/2008 |
| CN | 101360921 A | 2/2009 |
| CN | 101438065 A | 5/2009 |
| CN | 101849113 A | 9/2010 |
| DE | 35 35 719 C1 | 9/1986 |
| DE | 198 17 289 A1 | 10/1999 |
| DE | 10 2008 014 043 A1 | 9/2009 |
| DE | 10 2009 003 067 A1 | 11/2010 |
| WO | WO 03/051690 A1 | 6/2003 |
| WO | WO 2010/130481 A1 | 11/2010 |

* cited by examiner

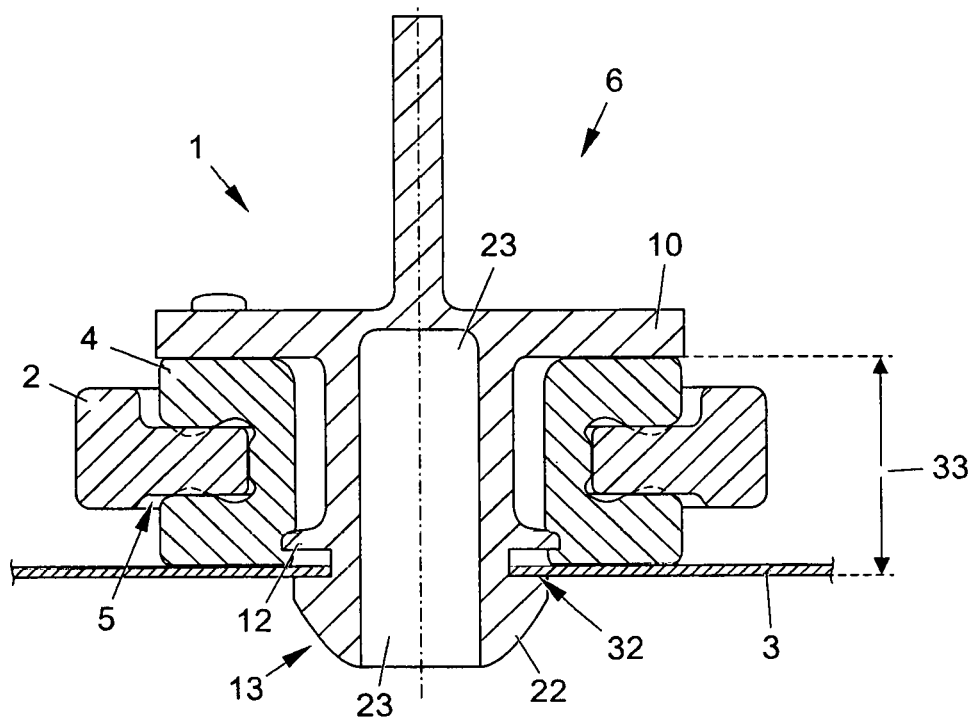
FIG. 2 Section A-A
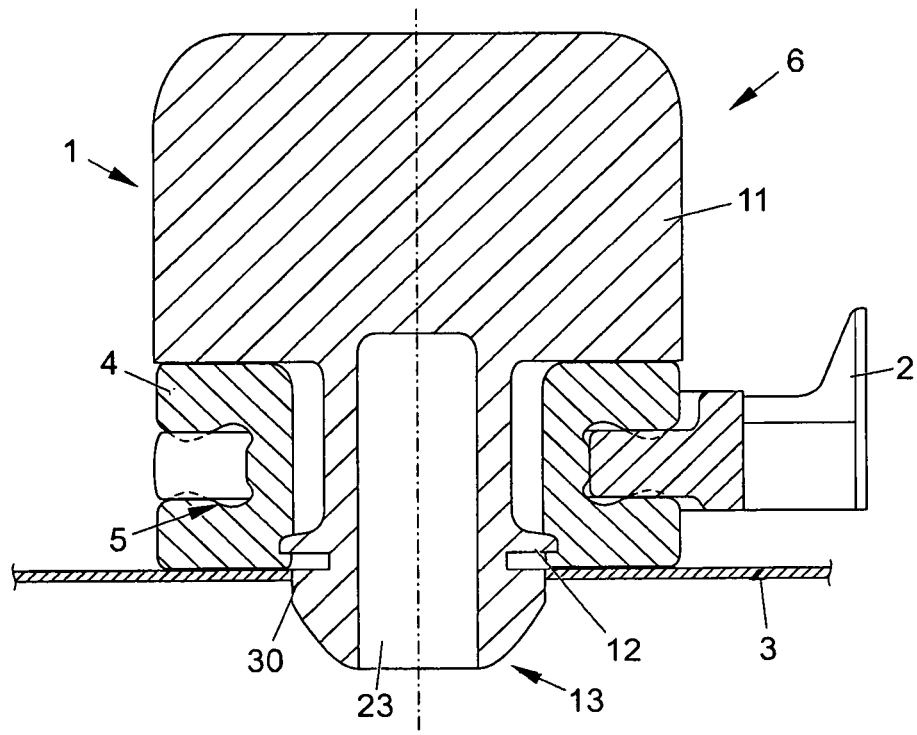
FIG. 3 Section B-B

CONFIGURATION COMPRISING A COMPONENT AND A FIXING SYSTEM FOR ELASTIC ATTACHMENT OF THE COMPONENT TO A PANEL-SHAPED SUPPORT PART

This nonprovisional application is a continuation of International Application No. PCT/EP2013/050556, which was filed on Jan. 14, 2013, and which claims priority to German Patent Application No. 10 2012 001 457.0, which was filed in Germany on Jan. 25, 2012, and which are both herein incorporated by reference.

BACKGROUND OF THE INVENTION

1. Field of the Invention

The invention relates to a configuration comprising a component equipped with a retaining foot, in particular a windshield wiper motor or a sliding roof motor or a window lifter motor as well as a fixing system with a fixing element for elastic attachment of the component to a panel-shaped support part, in particular to an automotive metal plate.

2. Description of the Background Art

A known generic configuration (WO 03/051690 A1) comprises a fixing system for elastic attachment of a component, namely a windshield wiper motor in this case, on a panel-shaped support part, in particular on a metal plate of a motor vehicle body. A fixing element is therefore provided with a central shaft-shaped connecting region to which a support plate with a rotary grip or a tool attachment is connected at one end and, at the other end, a cam element, so that the connecting region surrounds an elastomer sleeve which has a peripheral retaining groove on the outside. A retaining foot of the component which is closed in a ring shape engages in this retaining groove. In the assembled state, the cam element is plugged into a borehole in the manner of a keyhole in the support part, such that the fixing element and/or the cam element is twisted in the borehole for a latching connection and the cam element is supported from the rear side on the wall element of the support part such that the elastomer sleeve is elastically prestressed and compressed between the support plate and the support part.

The retaining foot which is closed in a ring shape here requires either a two-part elastomer sleeve which is separated at the retaining groove or a one-piece elastomer sleeve must be connected to the retaining foot that is closed in a ring shape. Both options involve complex assembly techniques and are cost intensive.

Furthermore, to manufacture a twist-proof catch connection in the region of the borehole and the cam element, a relatively complex latching contour is required; this is established here essentially by the shaping of the support part in the region around the borehole. This also requires further complex shaping and machining steps to produce the borehole on the support component, in particular on a metal plate of a motor vehicle body so that the machining costs on the support component are relatively high.

Another known configuration with a fixing system for a windshield wiper system (DE 198 17 289 A1) has a mostly similar design, but here again, the latching contour is shaped to the support part in the region of the borehole and/or on a motor vehicle body.

SUMMARY OF THE INVENTION

It is therefore an object of the invention to improve upon a generic configuration so that the attachment of the retaining foot to the elastomer sleeve can be performed more easily and less expensively. Another object is to make the design of the latching connection less expensive.

To do so, the region of the retaining foot which engages in the retaining groove of the elastomer sleeve is not closed in a ring shape but instead is designed as a retaining foot plug part with a partially open annular C-shape that is adapted to the inside diameter of the retaining groove. The elastomer sleeve may at any rate be molded in one piece and cohesively in the region of the retaining groove due to the possibility of attaching the retaining foot laterally to the elastomer sleeve in the retaining groove there. Due to the lateral attachment option, such a one-piece elastomer sleeve lacks a complex connecting procedure, such as that required with a retaining foot that is closed in the form of a ring. This facilitates assembly on the whole and advantageously reduces assembly time.

An elastic tie of the component to the support part with a combination of a force-locking and form-fitting connection for a stable means of securing the retaining foot plug part in such a manner that it cannot be pulled off is obtained in particular by the fact that the thickness of the material of the retaining foot plug part engaging in the retaining groove is coordinated with the groove width of the retaining groove so that in the assembled state with the elastomer sleeve under elastic prestress, the retaining foot plug part is accommodated and held in the retaining groove under elastic tension. This is accomplished essentially due to the fact that when pressing the elastomer sleeve is pressed into the retaining groove and prestressed, the groove width of the retaining groove is also reduced and/or the retaining foot plug part accommodated therein is clamped. Due to the C shape of the retaining foot plug part in combination with the great friction between the walls of the retaining groove and the retaining foot plug part, a stable retention is achieved so that it cannot be pulled out.

In an embodiment, at least one cam is shaped on the cam element, wherein after twisting a form-fitting through-connection with a carrier wall region surrounding the borehole is formed. Furthermore, a latching contour with at least one sliding slope is to be formed on the cam element such that with a twist the cam element is pulled further into the borehole due to the sliding slope and thus additional prestress is built up in the elastomer sleeve there perpendicular to the support part due to a shortening of the length between the support plate and the support part. In addition, the latching contour should have at least one rotary stop, which engages in the borehole for a rotationally secure latching in the end position of the turn after overcoming the sliding slope.

In an embodiment, the cam shape can be formed, in combination with the relatively complex latching contour, on the cam element and not on the carrier component. In the production of the fixing element, the cam element with its cam shapes can be manufactured easily and inexpensively together with the latching contour, in particular by an injection molding method. The complicated latching contour is thus created by injection molding, more or less without additional cost. On the support part, for example, an automotive metal plate, or a simple borehole is necessary in particular as a punched hole without any additional shaping and machining steps, so this reduces the cost of the support part.

For a rotationally secure locking engagement, it is further proposed specifically that the latching contour should have both a stop in the forward turned direction and a stop in the reverse direction of turning, such that the reverse turn stop is formed by a setback at the end of the sliding slope and is held in its stop position by the axle spring force of the prestressed elastomer sleeve.

In an embodiment having a borehole with at least one cam opening, preferably four cam openings is provided. Alternative borehole designs with two or five cam openings can also be provided, for example, if the stated active principle of the attachment to the cams, the sliding slopes, the turn stops and support straps is used. In an exemplary embodiment with four cam openings, the borehole on the support part has a central opening region with a core diameter and with the four cam openings protruding away from it laterally, two of which are opposite one another in mirror image and separated by four support straps situated in between. Four suitably shaped cams protruding on the cam element can be inserted through the four cam openings. A turn slot pointing radially inward and having a somewhat larger slot width than the material thickness of the support part extends on each of the cam top sides. The cam element with its cams below the support part can therefore be produced by turning from the borehole correspondence, such that the turn slots and/or the respective cams lie in the region of the support straps after twisting the fixing element, so that the cams can extend behind the support straps for support, to prevent the fixing element from being lifted up from the cams. The cam openings may thus be of such dimensions that the respective cams can be assembled only in the proper way, for example, opposite one another in pairs.

In another embodiment, a rising sliding slope for an increasing prestress of the elastomer sleeve when screwing in the fixing element lies in the screwing-in direction of the turn slots. In conjunction with the turn slot and the rising sliding slope, at least one turn stop is provided, limiting the turn into the screwing-in direction the element in and being supported laterally on a support strap in the end position of the turn. This ensures a rotationally secure support in the direction of turning.

In addition, a turn slot is limited in the screwing-in direction by a reverse turn stop, which is also active in the end position of the turn. The reverse turn stop is formed by a step-shaped setback formed in the insertion direction such that the wall of the step is pulled into the cam opening in the end position of the turn by the spring force of the prestressed elastomer sleeve and is in contact with a support strap laterally to the reverse turn support. The attachment is thus also held in a rotationally secure position in the reverse direction of turning. It can be seen here that the connection can be released only when such a great force is exerted on the fixing element in the insertion direction that the elastomer sleeve is pressed again against its spring force to such an extent that the reverse turn stop can be turned back again out of its latching position. It can be seen that the fixing system can be of dimensions such that forces which could loosen the reverse turn lock again do not occur during operation.

The fixing element can be designed as a plastic injection-molded part and the elastomer sleeve can be designed as a rubber sleeve.

A plate that can be bridged by the prestressed elastomer sleeve toward the support part may expediently be mounted as a spacer plate with a smaller diameter in comparison with the support plate on the fixing element in the region between the cam element and the elastomer sleeve. The spacer plate may be used as an assembly aid, in particular as a preassembly restraint for an attached elastomer sleeve.

To save on materials and weight, the fixing element may also have a central hollow bore.

Alternative or in addition to the preceding embodiments, it is thus possible to eliminate a C-shaped partially open ring shape of the retaining foot plug part and instead of that the retaining foot plug part can be designed with a closed ring contour. Furthermore, the spacer plate may have support cams which protrude in the direction of the panel-shaped support part. Furthermore the outer contour of the fixing element may be designed such that an equalization of tolerance with the borehole in the support part is made possible in the radial direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 shows a section along line A-A in FIG. 1, FIG. 3 shows a section along line B-B in FIG. 1.

DETAILED DESCRIPTION

Figure 1:
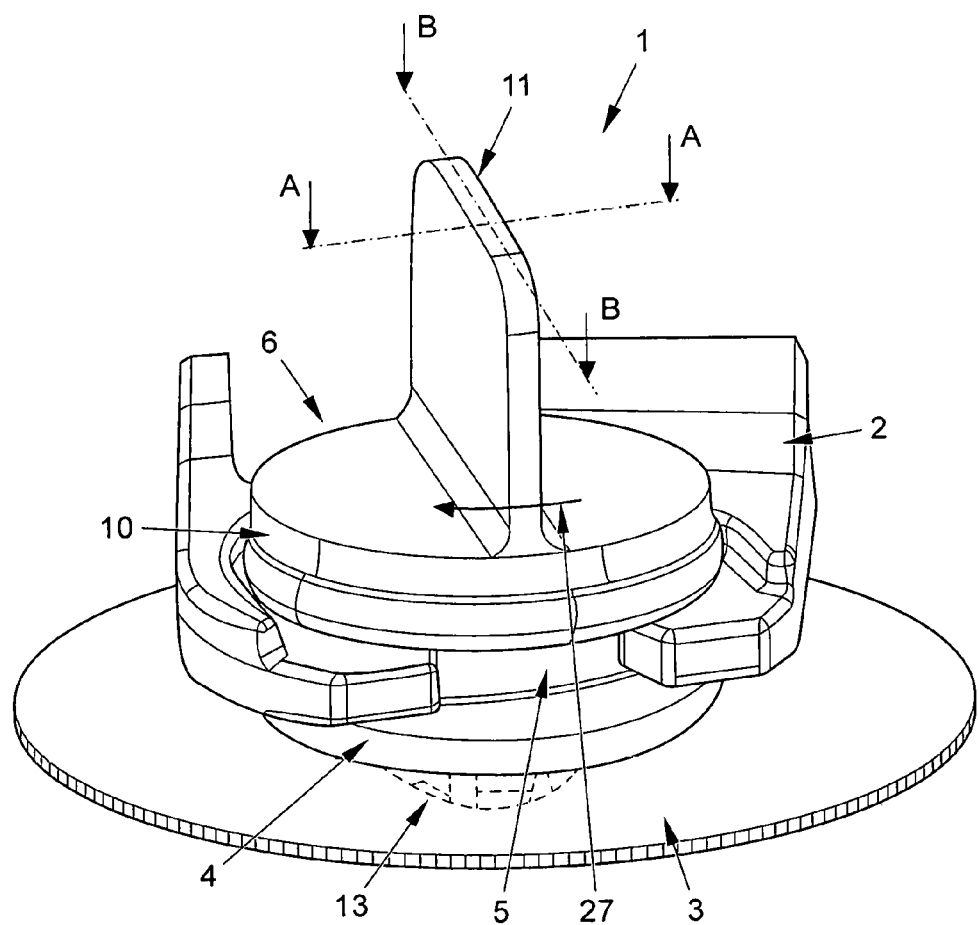
FIG. 1 shows a perspective view of an exemplary embodiment of an assembled fixing system according to the invention.

FIG. 1 shows a fixing system 1 for an elastic attachment of a retaining foot 2 of a component (not shown further here) in particular a windshield wiper motor on an automotive metal plate 3 as the support part.

Figure 6:
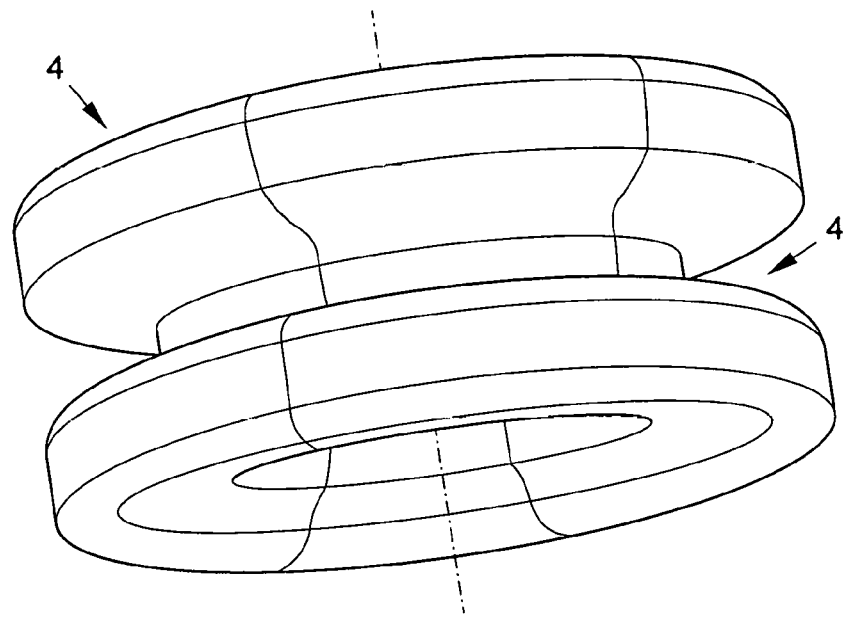
FIG. 6 shows a perspective diagram of an elastomer sleeve of the fixing system according to FIG. 1.

Therefore, an elastomer sleeve 4 with an outer peripheral retaining groove 5 is used. The elastomer sleeve 4 is held under axial prestress by means of a fixing element 6 on the automotive metal plate 3 with a turn-lock connection. The elastomer sleeve 4 is shown in perspective in FIG. 6.

Figure 7:
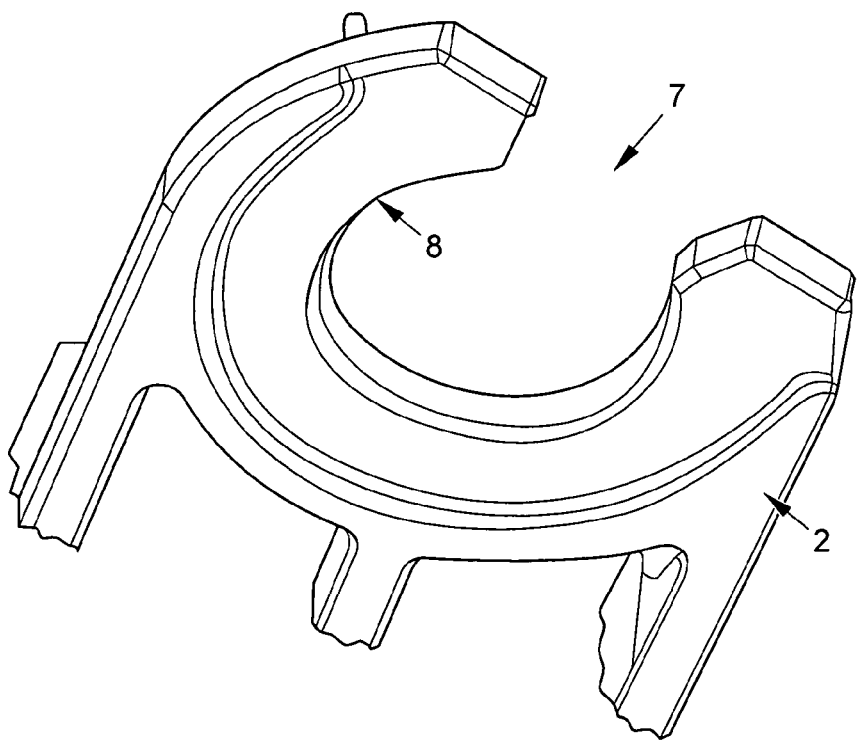
FIG. 7 shows a perspective view of a retaining foot according to FIG. 1 on a component to be fastened.

In particular FIG. 7 shows that the retaining foot 2 has a region designed as a retaining foot plug part 7 with a C-shaped ring shape 8 which is partially open and is adapted to the inside diameter of the retaining groove in particular.

For a connection of the elastomer sleeve 4 to the retaining foot 2, the latter is inserted laterally into the retaining groove 5. The thickness of the material in the region of the retaining plug part 7 in comparison with the width of the groove of the retaining groove 5 is selected so that, in addition to the form-fitting connection due to the C shape, by means of which a clamping connection is established due to the prestress on the elastomer sleeve 4 in the axial direction, as shown in FIGS. 1 to 3.

Figure 4:
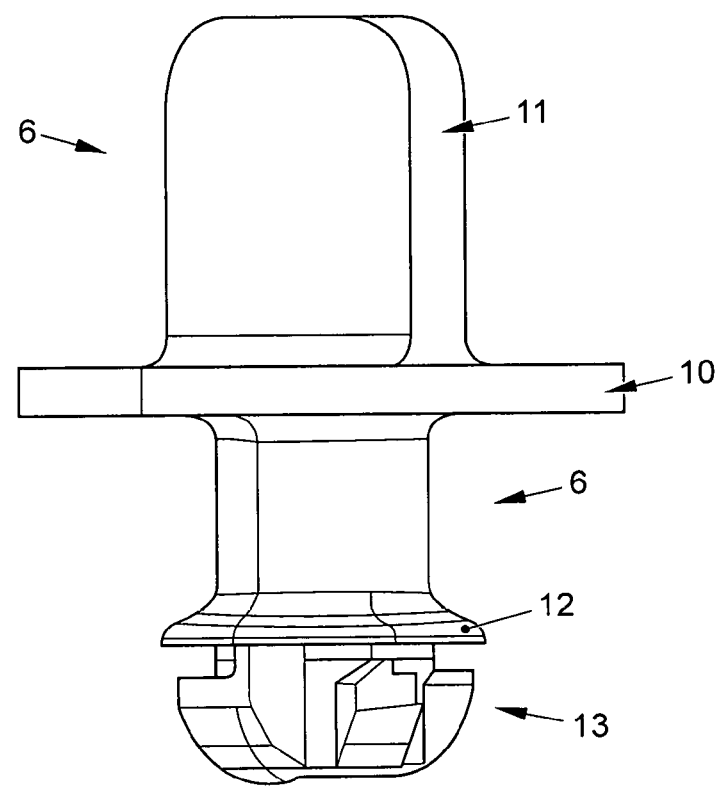
FIG. 4 shows a side view of a fixing element of the fixing system according to FIG. 1.

The fixing and axial prestress of the elastomer sleeve 4 on the automotive metal plate 3 are accomplished by means of the fixing element 6 shown in FIG. 4. This is produced as an injection-molded part and has a central cylindrical shaft 9 as the connecting region to which the elastomer sleeve 4 is attached. A support plate 10 with a turn handle 11 is connected to the shaft 9 at the top, such that the support plate 10 rests from above on the elastomer sleeve 4. Toward the bottom, a spacer plate 12, which is narrower than the support plate 10, and a cam element 13, which is shown enlarged in FIG. 5 to better illustrate the details, are connected to the shaft 9.

Another exemplary embodiment would also be to assemble the parts in the axial direction but with a separate elastomer sleeve 4 and a separate turn handle 11. Furthermore, instead of an injection-molded part, a die-cast part, a press-molded part or a hot-pressed part could also be used.

Figure 8:
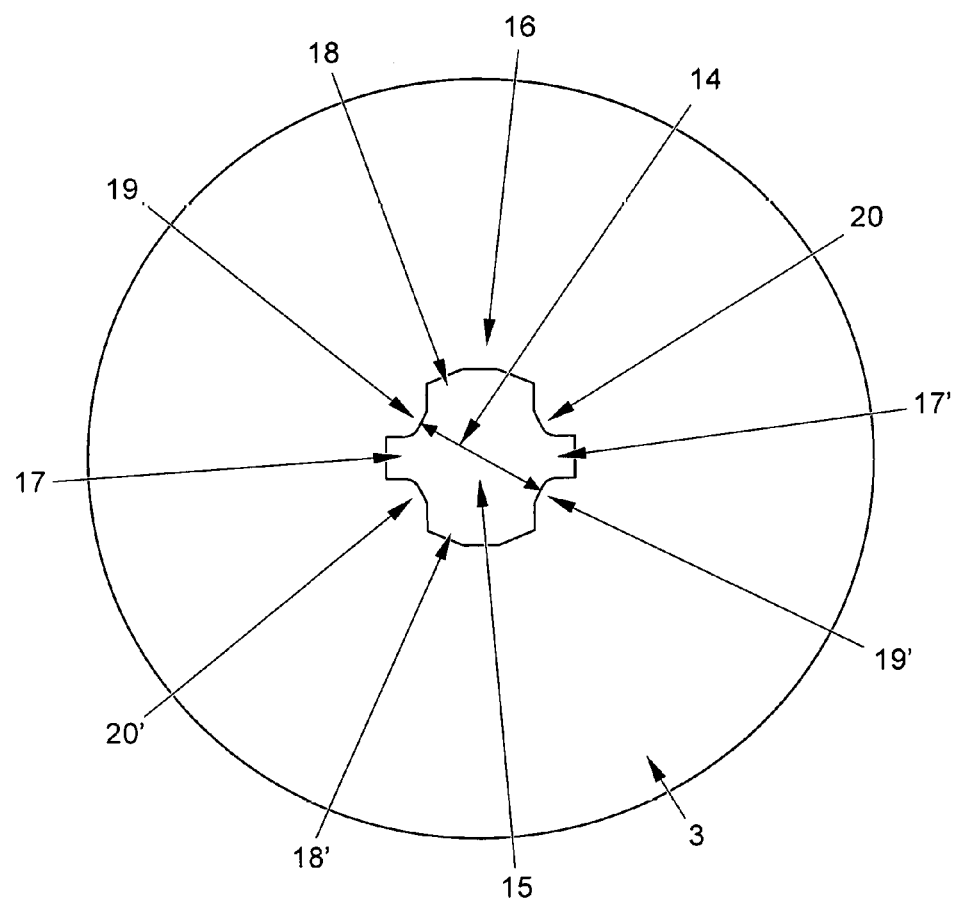
FIG. 8 shows a round section of an automotive body metal plate as the support part according to FIG. 1 with a borehole.

The cam element 13 engages in a punched borehole 14 on the automotive metal plate 3 to establish a turn-latch connection, as shown in FIG. 8. The borehole 14 here has a central open region 15 with a core diameter 16, with four cam openings 17, 17' and 18, 18' protruding away from it laterally, the two cam openings 17, 17' and 18, 18' each having different designs and each being opposite the other in mirror image. The cam openings are spaced a distance apart and separated by four support straps 19, 19' and 20, 20' situated in between.

Figure 5:
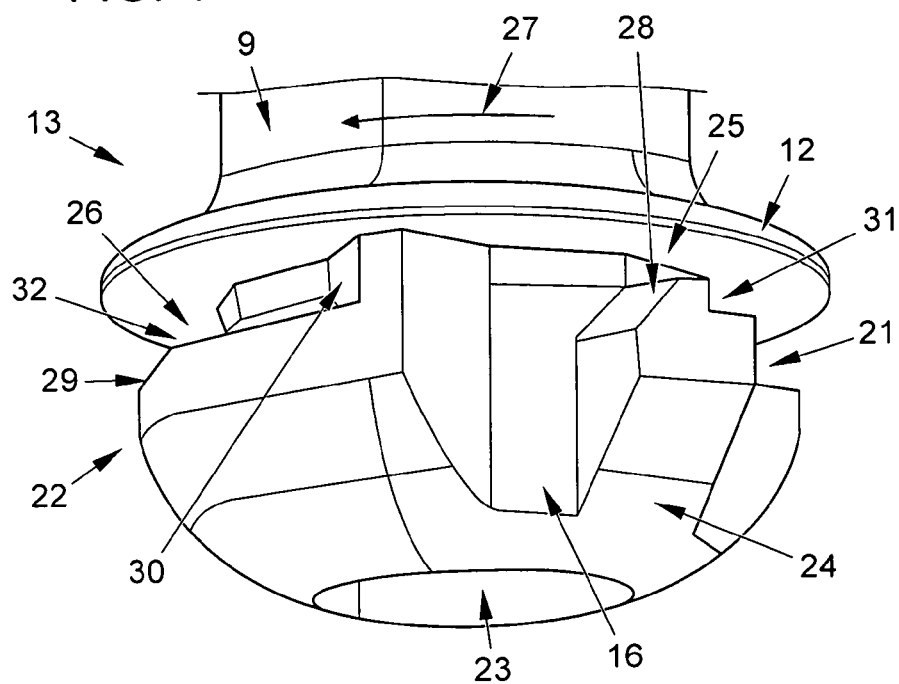
FIG. 5 shows an enlarged diagram of the lower cam element of the fixing element according to FIG. 4.

Four respective cams of the cam element 13, each designed with a corresponding insertion contour, can be inserted into the four cam openings 17, 17' and 18, 18', such that in FIG. 5 shows a first (smaller) one of the cams 21 assigned to the cam opening 17' and also a second (larger) one of the cams 22 assigned to the cam opening 18'. The two other cams, which are opposite the cams 21, 22 in mirror image (not visible in FIG. 5), have the same design.

As can also be seen in FIGS. 2 and 3 in particular, the fixing element 6 has a hollow bore 23 and the shaft has an outside diameter corresponding to the core diameter 16 of the borehole 14, which is continued downward into the cam region with the cams 21, 22 protruding radially away from it. The cam element 13 with the insertion slopes 24 tapers at the lower end region.

A turn slot 25, 26, which is guided radially inward to the core diameter 16 runs between the spacer plate 12 and the cams 21, 22. A sliding slope 28, 29 is provided on the cams 21 and 22 toward the start of the turn slots 25, 26 in the screwing-in direction (arrow 27). Based on the screwing-in direction 27, a screwing-in stop 30, which is supported on the side edge of the support strap 20' in the end position of turning at the end of the turn slot 25, the support strap then being accommodated in the turn slot 26. A reverse turn slot 31 is formed on the cam 21 by a step-shaped setback, such that the wall of the step is drawn into the respective cam opening by the axial spring force of the elastomer sleeve 4, which, in the assembled state, is prestressed in the end position of turning and is in contact with the cam opening edge there. To make this possible, it could be seen that the axial width of the turn slot 26 is greater than that of the turn slot 25, which corresponds approximately to the thickness of the material of the automotive metal plate 3. The radial width of the turn slot 25 in the region of the step-shaped setback on the reverse turn stop 21 corresponds to the width of the turn slot 26.

As can be seen in FIG. 2, the section A-A there is guided outside of the stops 30, 31, so that the cams 21, 22 are supported from the bottom on the automotive metal plate 3 with their cam top side 32 and/or the bottom wall of the turn slot 25, 26. However, the section B-B according to FIG. 3 is guided in the region of the stops 30, 31. As also shown in FIG. 2, the significant measure (arrow 33) on the fixing element 6 for the adjustment of height for pressing the elastomer sleeve 4 is the length between the bottom side of the support plate 10 and the cam top side 32 in combination with the thickness of the material of the automotive metal plate 3.

In assembly of the fixing system 1, the fixing element 6 is thus inserted with the attached elastomer sleeve 4 with the cam element 13 through the borehole 14 in the automotive metal plate 13. By subsequent turning there is a permanent pressing and creation of a prestress in the elastomer sleeve 4 and a twist lock by sliding up onto the sliding slopes 28, 29. This permits a fixing including damping of a component with the attached retaining foot such that the fixing is secured to prevent automatic loosening.

Figure 9:
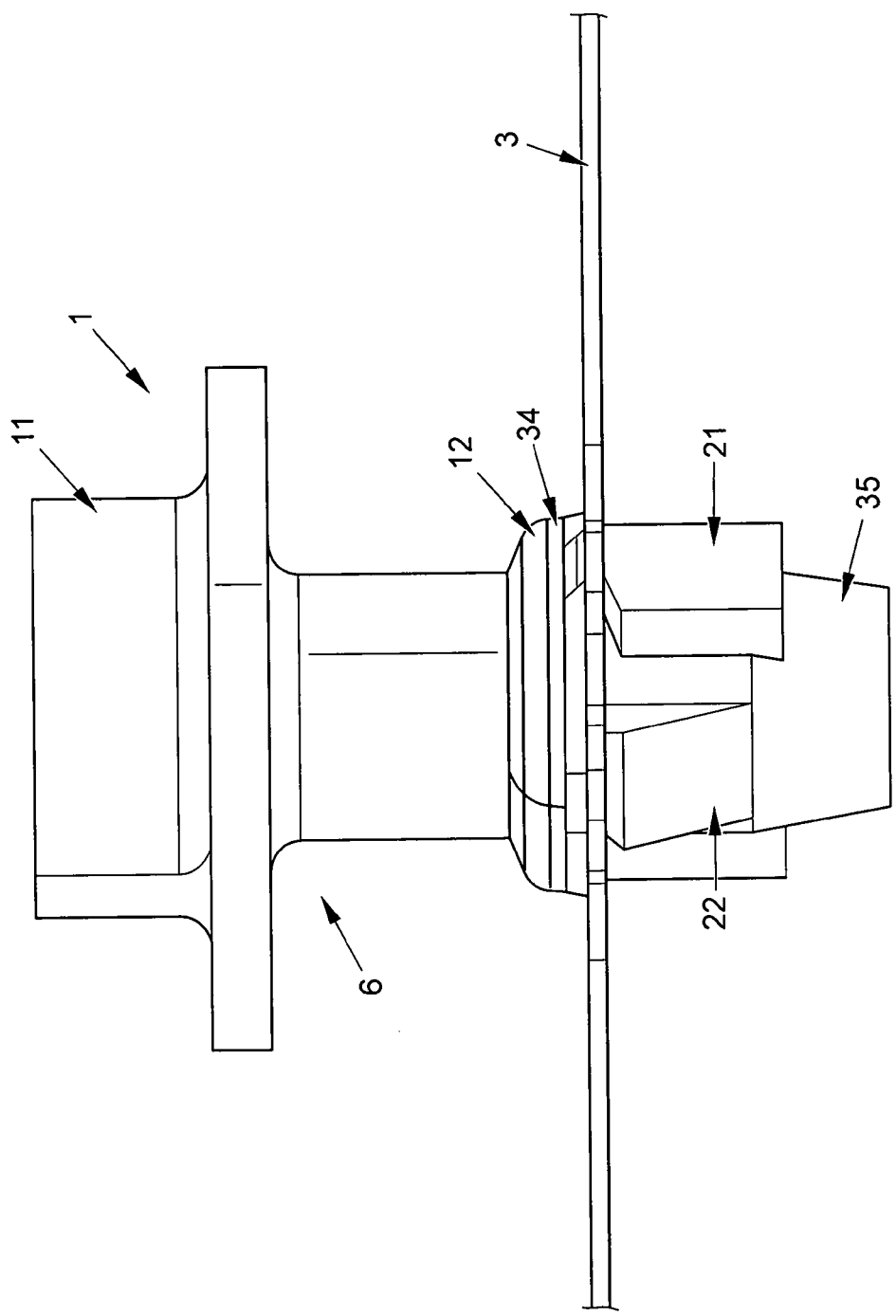
FIG. 9 shows the fixing system in another embodiment.

FIG. 9 shows a fixing element according to another exemplary embodiment, whose structure and functioning are fundamentally identical to those of the preceding exemplary embodiment. It is therefore possible to refer back to the description of the preceding exemplary embodiment. In contrast with the preceding exemplary embodiment, the spacer plate 12 in FIG. 9 has additional support cams 34, which protrude axially in the direction of the automotive metal plate 3. These serve to provide axial stabilization and to improve the transfer of force. Furthermore, the fixing element 6 in FIG. 8 is lengthened in the axial direction with an insertion cone 35. The cams 21, 22 shown in FIG. 9 have different heights to increase the process reliability in assembly.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A configuration comprising:
   a retaining foot;
   a fixing system with a rotatable fixing element is provided an elastic attachment of the retaining foot to a panel-shaped support part;
   wherein the fixing element has a central connecting region as a shaft to which a support plate with a turn handle or a tool attachment is attached at one end and to which a cam element is attached at the other end, and an elastomer sleeve surrounds the connecting region, the elastomer sleeve having a retaining groove which is at least partially circumferential on an outside and in which the retaining foot engages,
   wherein the cam element, in an assembled state, is inserted through a borehole in the support part such that the fixing element is rotated by the turn handle or the tool attachment for a latching connection with the support part and the elastomer sleeve is compressed between the support plate and the support part and is elastically prestressed, and
   wherein a region of the retaining foot that engages in the retaining groove of the elastomer sleeve is a retaining foot plug part with an annular shape that is partially open in a C shape and is adapted to an inside diameter of the retaining groove.

2. The configuration according to claim 1, wherein the groove width of the retaining groove and a material thickness of the retaining foot plug part engaging in the retaining groove are coordinated with one another so that in the assembled state with the elastomer sleeve under elastic prestress, the retaining foot plug part is accommodated and held in the retaining groove under elastic tension.

3. The configuration according to claim 1, wherein the fixing element is an injection-molded plastic part and the elastomer sleeve is a rubber sleeve.

4. The configuration according to claim 1, wherein a spacer plate is mounted in a region above the cam element and is bridged laterally by the prestressed elastomer sleeve.

5. The configuration according to claim 1, wherein the fixing element has a central hollow bore.

6. The configuration according to claim 1, wherein the retaining foot is a windshield wiper motor, a sliding roof motor or a window lifter motor.

7. The configuration according to claim 1, wherein the panel-shaped support part is an automotive metal plate of a motor vehicle.

8. The configuration according to claim 1, wherein the cam element includes at least two cams provided thereon, a first cam being larger than a second cam.

9. The configuration according to claim 8, wherein the borehole in the support part has a central opening region and at least two cam openings extending from the central opening region, a first cam opening being larger than a second cam opening, and wherein the first cam being inserted into the first cam opening and the second cam being inserted into the second cam opening.

10. A configuration comprising:
a retaining foot;
a fixing system with a fixing element is provided an elastic attachment of the retaining foot to a panel-shaped support part;
wherein the fixing element has a central connecting region as a shaft to which a support plate with a turn handle or a tool attachment is attached at one end and to which a cam element is attached at the other end, and an elastomer sleeve surrounds the connecting region, the elastomer sleeve having a retaining groove which is at least partially circumferential on an outside and in which the retaining foot engages,
wherein the cam element, in an assembled state, is inserted through a borehole in the support part such that the fixing element is rotated for a latching connection with the support part and the elastomer sleeve is compressed between the support plate and the support part and is elastically prestressed, and
wherein a region of the retaining foot that engages in the retaining groove of the elastomer sleeve is a retaining foot plug part with an annular shape that is partially open in a C shape and is adapted to an inside diameter of the retaining groove, and
wherein at least one cam is formed on the cam element for establishing a form-fitting through connection after a turn with a support wall region surrounding the borehole and/or a latching contour with at least one sliding slope is formed on the cam element such that with a turn the cam element is moved further into the borehole by sliding on a slope and thus a prestress is built up in the elastomer sleeve there perpendicular to the support part due to the shortening of the length between the support plate and the support part, and wherein the latching contour has at least one turn stop that engages in the borehole after overcoming the sliding slope for a rotationally secure engagement in an end position after turning.

11. The configuration according to claim 10, wherein the latching contour has a tightening stop and a reverse turn stop, and wherein the reverse turn stop is formed by a setback at an end of the sliding slope and is held in a stop position by an axial spring force of the prestressed elastomer sleeve.

12. The configuration according to claim 10, wherein the borehole has a central opening region with a core diameter on the support part, wherein at least one cam opening protrudes laterally away from the core diameter such that two support straps are opposite one another in a mirror image and are separated from four cam openings by four support straps in between, wherein the respective cams of a corresponding design of the cam element is insertable through the at least one cam opening, and wherein a turn slot, which extends radially inward and running on a top side of the cam, encloses a support wall region after rotation of the fixing element in a region of the support strap so that the cams reach behind the support straps for support to prevent lifting of the fixing element.

13. The configuration according to claim 12, wherein the turn slot has a rising sliding slope for creating the prestress in the elastomer sleeve in a direction of rotation, and wherein the turn slot is limited by a turn stop in the direction of rotation, the turn stop being supported laterally on a cam opening edge in an end position of rotation, wherein the turn slot is limited by a reverse turn stop in the direction of rotation, the turn stop being formed by a step-shaped setback formed in an insertion direction such that the wall of the step is pulled into a cam opening in the end position of rotation via the spring force of the prestressed elastomer sleeve and is in contact with the cam opening edge laterally for reverse turn support.

14. The configuration according to claim 12, wherein four cam openings protrude laterally away from the core diameter.

* * * * *